Jan. 27, 1942.  O. J. ANDERSON  2,270,860
MACHINE TOOL
Filed May 6, 1940  2 Sheets-Sheet 1

INVENTOR
Oscar J. Anderson
By Parker, Carlson, Pitzner & Hubbard
ATTORNEYS

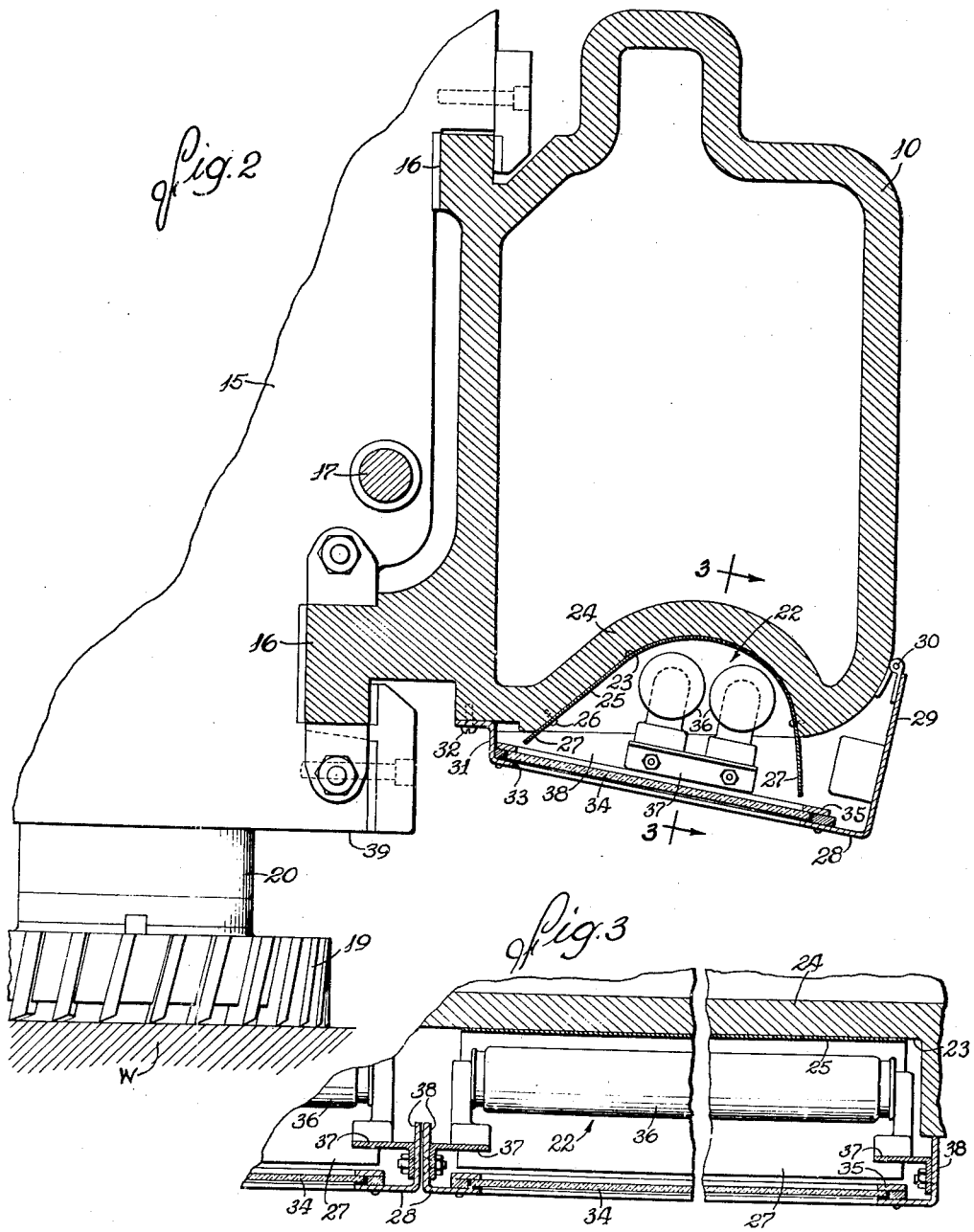

Patented Jan. 27, 1942

2,270,860

UNITED STATES PATENT OFFICE 2,270,860

MACHINE TOOL

Oscar J. Anderson, Rockford, Ill., assignor to The Ingersoll Milling Machine Company, Rockford, Ill., a corporation of Illinois Application May 6, 1940, Serial No. 333,577

8 Claims. (Cl. 90—11)

This invention relates to machine tools of the type having a horizontal work table and a tool and head slidable along ways on a frame member, either a vertical column or a cross rail, to adjust the cutter position or to mill various portions of a work piece on the table.

The object of the invention is to construct the frame member supporting the tool head in a novel manner and combine the same with illuminating means which is disposed in an out of the way position, which is well protected against mechanical injury, and which directs light onto the cutter and work in various positions of the latter along the frame member.

Other objects and advantages of the invention will become apparent from the following detailed description taken in connection with the accompanying drawings, in which Figure 1 is a front elevational view of a cross-rail milling machine embodying the novel features of the present invention.

Fig. 2 is a section taken along the line 2—2 of Fig. 1.

Fig. 3 is a section taken along the line 3—3 of Fig. 2.

Figure 1:
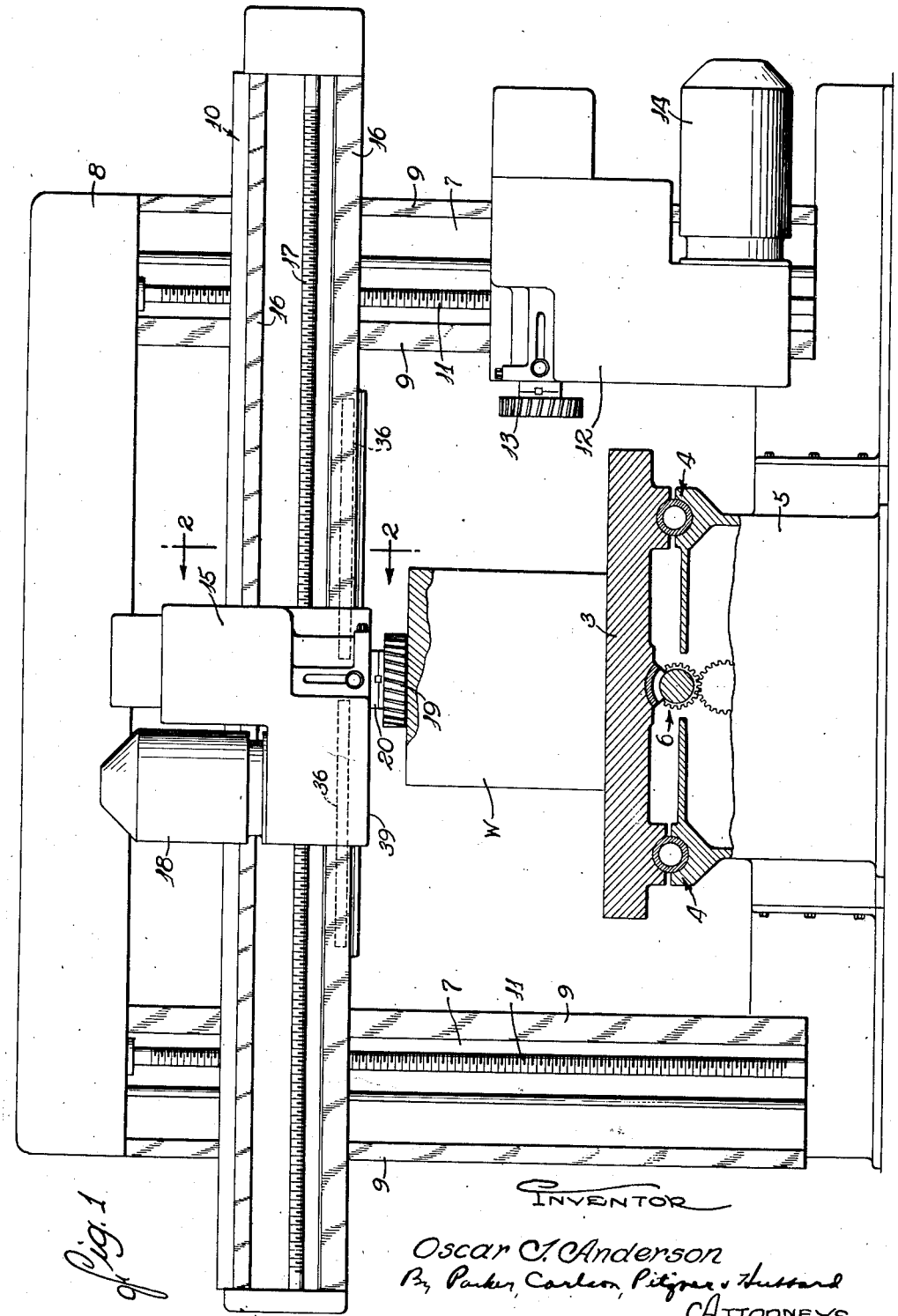

Milling machines and planers of the type shown in the drawings include a work table 3 supported for horizontal reciprocation by ways 4 on an elongated bed 5 on which is mounted mechanism indicated at 6 for feeding the table back and forth. Bridging the table is a frame comprising vertical columns 7 rigidly connected at their lower ends to the bed 5 and at the upper ends by a bridge 8. The front face of each column is formed with a pair of spaced parallel ways 9 on which slides a horizontal frame member or cross-rail 10 which may be raised and lowered as desired by rotating feed screws 11. In the case of a milling machine a tool head 12 is also mounted on one or both of the columns 7. This head is slidable along the ways 9 and carries a cutter 13 driven by a motor 14 and facing horizontally so as to be operable on the vertical side of a work piece supported on the table.

A similar head 15 carrying a tool 19 is slidable horizontally along ways 16 on the front of the rail 10 being moved back and forth by a suitable feed mechanism including a screw 17. If the tool is a milling cutter a motor 18 on the head drives a cutter 19 facing downwardly and carried on the end of a quill 20 that may be raised and lowered in the usual way.

In machines of the above character, the upper frame members, that is, the rail 10 and the columns 7, are usually of hollow construction, and the ways 9 and 16 are disposed on the front of the column and rail so that the side of each frame member adjacent the work table is free and open. The present invention takes advantage of the foregoing inherent characteristics to provide for effective illumination of each cutter, when acting on a work piece, in all of its positions of adjustment along its supporting frame member and for effective protection of the illuminating means as an incident to setting up the work on the table, traversing of the rail, adjustment of the heads along their guideways, and actual machining of the work.

To the foregoing ends, the side of the frame member facing the work table is recessed and provides a housing for illuminating means arranged along the supporting frame member to direct the major portion of its light rays toward the associated cutter. Herein, the illuminating means indicated generally at 22 is applied to the cross-rail 10 which is cast with a downwardly opening recess 23 in its lower wall 24, the recess extending longitudinally substantially throughout the length of the rail. The recess 23 may be lined with a sheet 25 of bright metal secured to the rail wall 24 as by screws 26 so as to define a concave reflecting surface adapted to direct light rays downwardly and forwardly in the direction of the cutter 19. The edges 27 of the sheet 25 may be extended below the rail at the angles necessary to produce optimum effectiveness in reflection of the light rays downwardly and forwardly onto the cutter 19 and the portion of the work W which it is operating on.

The rail recess 23 coacts with a shell or cover 28 to form a lamp casing. The shell is substantially flat and inclined as shown having an upstanding rear flange 29 hinged at 30 to the rear wall of the rail and a shorter flange 31 detachably secured as by screws 32 to the bottom of the rail near the front thereof. Apertures 33 in the shell through which the light is directed are covered by a transparent plate 34 fastened to the shell by edge clamps 35.

In the present instance, the illuminating means 22 comprises electric lamps 36 in the form of elongated tubes preferably of the fluorescent type. These are arranged parallel to each other within the rail recess 23 adjacent the reflector 25 being supported by end brackets 37 bolted or otherwise secured to end flanges 38 upstanding from the shell 28. The reactor by which operation of such lamp is initiated may be mounted within the housing on the cover flange 29. Since the lamps are mounted on the shell and the reflector is fastened to the rail, the lamp housing may be opened for replacement of the lamps or for other reasons, simply by removing the screws 32 and swinging the shell downwardly about the pivot 30.

To minimize the danger of damaging the lamp cover in the ordinary use of the milling machine, it is disposed as shown in Fig. 2 above the level of the under side 39 of the head. In order to traverse a work piece W back and forth beneath the rail, the latter will ordinarily be positioned with the head housing disposed about the top of the work piece. Thus, the work piece will pass beneath the parts of the lamp housing which protrude from the rail recess.

It will be observed that the illuminating means 22 is disposed in an out of the way position within and beneath the cross-rail 10 so as not to interfere in any way with the normal operations of setting up the work on the table, traversing the work past the cutter, raising and lowering the rail 10, and moving the head 13 along the rail. The lamps being located immediately behind and above the cutter, the light rays will be directed onto the cutter and the portion of the work being operated on, and this in spite of the fact that the rays must be directed downwardly. In the location shown, the lamps being disposed in the rail recess are fully protected against mechanical injury or displacement and the cover projects such a short distance below the rail that there is little danger of it being struck by a work piece which must be disposed to pass beneath the lower end 39 of the tool head.

I claim as my invention:

1. A machine tool of the character described having, in combination, a horizontal work table, an elongated rail disposed above and extending across said table having a recess formed along its under side, a tool head disposed in front of and slidable along said rail, a cutter projecting downwardly from said head, and illuminating means disposed in said recess longitudinally of the rail and arranged to direct light downwardly and forwardly to illuminate said cutter in different positions of said head along said rail.

2. A machine tool of the character described having, in combination, a horizontal work table, an elongated stationary frame member adjacent said table having a side facing toward the table formed with a recess extending longitudinally of said member, a tool head disposed in front of and slidable along said member, a cutter projecting from said head and facing toward said table, a lamp comprising an elongated tube disposed in said recess and extending longitudinally thereof so as to direct light onto said cutter and a work piece being operated thereon in all longitudinal positions of said head along said ways.

3. A machine tool of the character described having, in combination, a horizontal work table, a cross rail disposed about said table, a tool head disposed in front of and slidable along said rail, a cutter on said head projecting downwardly, illuminating means extending along the under side of said rail to direct light toward said cutter, and a cover supported on said rail and coacting therewith to form a housing for said illuminating means, all of the parts of said housing being disposed above the under side of said head so as to be protected mechanically by said head.

4. A machine tool of the character described having, in combination, a horizontal work table, an elongated stationary frame member adjacent said table having a recessed side facing toward the table, a tool head disposed in front of and slidable along said member, and carrying a cutter facing toward said table, and illuminating means housed in the recessed side of said member and arranged to direct light toward said table in a forwardly inclined direction whereby to illuminate said cutter and the portion of a work piece being operated on.

5. A machine tool of the character described having, in combination, a horizontal work table, an elongated stationary frame member adjacent said table having a recessed side facing toward the table and a front side providing guideways facing along the table, a tool head disposed in front of and slidable along said ways and carrying a cutter spindle projecting toward said table, and illuminating means housed in the recessed side of said member and arranged to direct light from the member toward said table at points spaced longitudinally of the member whereby to illuminate a cutter on said spindle in different positions of said head along said ways.

6. A machine tool of the character described having, in combination, a horizontal work table, an elongated stationary frame member adjacent said table having a recessed side facing toward the table, a tool head disposed in front of and slidable along said member, a cutter on said head projecting toward said table, illuminating means disposed adjacent said recessed side to direct light toward said cutter, and a cover supported on the recessed side of said member and coacting therewith to form a housing for said illuminating means, all of the parts of said housing being disposed on the side of the cutter face opposite said table so as to be protected mechanically by said head.

7. A machine tool of the character described having, in combination, a horizontal work table, an elongated stationary frame member adjacent said table, having a recess on the side thereof facing the table, a tool head disposed in front of and slidable along said member, a cutter projecting from said head toward said table, a cover for said recess coacting with said member to provide a lamp housing and pivoted on the member to swing away from the latter to open and close the recess, a lamp mounted on said cover within said recess and rendered accessible by opening of the cover, and a reflector for said lamp supported on said member in said recess independently of said cover.

8. A machine tool of the character described having, in combination, a horizontal work table, a crossrail disposed above said table and having a downwardly opening recess in its underside, a tool head disposed in front of said rail and carrying a cutter disposed below said recess, and illuminating means housed in said recess near the rear side thereof so as to be protected mechanically by said rail and to direct light forwardly and downwardly onto said cutter and the work engaged thereby.

OSCAR J. ANDERSON.